United States Patent
Standaar et al.

(10) Patent No.: US 11,311,137 B2
(45) Date of Patent: Apr. 26, 2022

(54) EXCHANGEABLE SUPPLY PACK FOR A BEVERAGE DISPENSING MACHINE, DOSER, PUMP ASSEMBLY AND METHOD OF MANUFACTURING

(71) Applicant: Koninklijke Douwe Egberts B.V., Utrecht (NL)

(72) Inventors: Koen Standaar, Utrecht (NL); Leonardus Henricus Wilhelmus Giesen, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 894 days.

(21) Appl. No.: 15/197,274

(22) Filed: Jun. 29, 2016

(65) Prior Publication Data
US 2016/0302610 A1 Oct. 20, 2016

Related U.S. Application Data

(63) Continuation of application No. PCT/NL2015/050002, filed on Jan. 2, 2015.

(30) Foreign Application Priority Data

Jan. 3, 2014 (NL) .................................... 2012043

(51) Int. Cl.
A47J 31/40 (2006.01)
A47J 31/46 (2006.01)

(52) U.S. Cl.
CPC .......... *A47J 31/402* (2013.01); *A47J 31/468* (2018.08)

(58) Field of Classification Search
CPC ........ A47J 31/40; A47J 31/402; A47J 31/404; A47J 31/407; A47J 31/41; A47J 31/4492;
(Continued)

(56) References Cited

U.S. PATENT DOCUMENTS 3,876,347 A 4/1975 Becker
5,927,553 A 7/1999 Ford
(Continued)

FOREIGN PATENT DOCUMENTS

AU 2015255218 A1 11/2015
AU 2016253679 A1 11/2016
(Continued)

OTHER PUBLICATIONS

International Search Report and Written Opinion, PCT/NL2015/050002, Koninklijke Douwe Egberts B.V., 10 pages (dated Apr. 29, 2015).

(Continued)

*Primary Examiner* — Dana Ross
*Assistant Examiner* — Joe E Mills, Jr.
(74) *Attorney, Agent, or Firm* — Fitch, Even, Tabin & Flannery LLP

(57) ABSTRACT

An exchangeable supply pack for a beverage dispensing machine. The pack comprises a doser including a pump assembly comprising a pump channel between an inlet and an outlet, for receiving a fluid from an ingredient container and for pumping it to the outlet. The pump assembly comprises a pump chamber and at least two engaging gears forming a gear pump. At least one of said gears forms a driving gear and comprises a shaft opening for receiving a driving axle of the beverage dispensing machine. The shaft opening coincides with an axle reception opening of a support wall of the pump chamber, and a flexible seal is arranged at least between the driving gear and the support wall. The seal comprises a through opening coinciding with the shaft opening and the axle reception opening for receiving the driving axle.

20 Claims, 9 Drawing Sheets

(58) Field of Classification Search
CPC ... B67D 1/0007; B67D 1/0037; B67D 1/0044
USPC .................. 99/295, 290, 323, 287; 235/375;
222/327, 130, 642, 129.1, 62, 23, 54, 1;
62/56
See application file for complete search history.

(56) References Cited

U.S. PATENT DOCUMENTS

| | | | |
|---|---|---|---|
| 8,820,577 B2* | 9/2014 | Rusch | B67B 7/28 222/129.1 |
| 2006/0144244 A1 | 7/2006 | Girard | |
| 2007/0178003 A1 | 8/2007 | Zhu | |
| 2009/0017177 A1 | 1/2009 | Yoakim et al. | |
| 2009/0320692 A1 | 12/2009 | Simanski | |
| 2010/0015307 A1 | 1/2010 | Abegglen et al. | |
| 2011/0185910 A1 | 8/2011 | Ryser | |
| 2011/0200726 A1* | 8/2011 | Tinkler | A47J 31/32 426/431 |
| 2012/0305603 A1 | 12/2012 | Kwok et al. | |
| 2013/0099597 A1 | 4/2013 | Perentes et al. | |
| 2013/0180408 A1 | 7/2013 | Eichler et al. | |
| 2013/0322202 A1 | 12/2013 | Klopfenstein et al. | |
| 2014/0170271 A1 | 6/2014 | Zweed et al. | |
| 2014/0178537 A1 | 6/2014 | Zweed et al. | |
| 2015/0020689 A1 | 1/2015 | Biewenga | |

FOREIGN PATENT DOCUMENTS

| | | |
|---|---|---|
| AU | 2017219060 A1 | 9/2017 |
| CA | 2901582 A1 | 11/2014 |
| CN | 2283743 Y | 6/1998 |
| CN | 1997585 A | 7/2007 |
| CN | 101657643 A | 2/2010 |
| CN | 101786589 A | 7/2010 |
| CN | 102574672 A | 7/2012 |
| CN | 102808765 A | 12/2012 |
| DE | 10 2008 014 758 A1 | 10/2009 |
| DE | 20 2009 009 125 U1 | 10/2010 |
| DE | 10 2010 027 484 A1 | 1/2012 |
| DE | 10 2010 034 260 A1 | 2/2012 |
| DE | 10 2010 047 890 A1 | 2/2012 |
| DE | 20 2013 005 950 U1 | 11/2013 |
| DE | 20 2015 004 716 U1 | 11/2015 |
| EP | 0 844 195 B1 | 5/1998 |
| EP | 1 165 398 B1 | 1/2002 |
| EP | 1 190 959 B1 | 3/2002 |
| EP | 1 299 022 B1 | 4/2003 |
| EP | 1 339 305 B1 | 9/2003 |
| EP | 1 646 305 B1 | 4/2006 |
| EP | 1 654 966 B1 | 5/2006 |
| EP | 1 700 548 B1 | 9/2006 |
| EP | 1 700 584 A1 | 9/2006 |
| EP | 1 816 934 B1 | 8/2007 |
| EP | 1 839 543 B1 | 10/2007 |
| EP | 1 849 715 B1 | 10/2007 |
| EP | 1 859 712 B1 | 11/2007 |
| EP | 1 859 714 B1 | 11/2007 |
| EP | 1 882 431 B1 | 1/2008 |
| EP | 1 882 432 B1 | 1/2008 |
| EP | 1 892 199 A1 | 2/2008 |
| EP | 1 900 653 B1 | 3/2008 |
| EP | 1 967 099 B1 | 9/2008 |
| EP | 2 012 994 B1 | 1/2009 |
| EP | 2 029 457 B1 | 3/2009 |
| EP | 2 068 684 B1 | 6/2009 |
| EP | 2 070 828 B1 | 6/2009 |
| EP | 2 142 054 B1 | 1/2010 |
| EP | 2 151 313 B1 | 2/2010 |
| EP | 2 205 133 B1 | 7/2010 |
| EP | 2 229 082 B1 | 9/2010 |
| EP | 2 230 195 A1 | 9/2010 |
| EP | 2 284 100 B1 | 2/2011 |
| EP | 2 284 101 B1 | 2/2011 |
| EP | 2 334 564 B1 | 6/2011 |
| EP | 2 364 930 A2 | 9/2011 |
| EP | 2 374 383 B1 | 10/2011 |
| EP | 2 385 922 B1 | 11/2011 |
| EP | 2 489 609 A1 | 8/2012 |
| EP | 2 512 302 B1 | 10/2012 |
| EP | 2 573 008 A1 | 3/2013 |
| EP | 2 631 198 A1 | 8/2013 |
| EP | 2 631 199 A1 | 8/2013 |
| EP | 2 682 028 A1 | 1/2014 |
| EP | 2 690 035 A1 | 1/2014 |
| EP | 2 712 824 A1 | 4/2014 |
| EP | 2 757 056 A1 | 7/2014 |
| EP | 2 801 538 A1 | 11/2014 |
| EP | 2 868 598 A1 | 5/2015 |
| EP | 3 023 360 B1 | 5/2016 |
| ES | 1137034 U | 3/2015 |
| ES | 1142506 U | 8/2015 |
| FR | 2973209 A1 | 10/2012 |
| GB | 2 431 395 A | 4/2007 |
| GB | 2 503 697 B | 12/2014 |
| GB | 2 519 319 A | 4/2015 |
| GB | 2 503 774 B | 6/2015 |
| GB | 2 523 775 A | 9/2015 |
| JP | S50-064003 | 11/1976 |
| JP | H04-019681 | 2/1992 |
| JP | S38-013141 | 1/1993 |
| JP | H1030578 A | 2/1998 |
| JP | 2001236560 | 8/2001 |
| JP | 2005-171892 | 6/2005 |
| JP | 2008-505031 | 2/2008 |
| JP | 2009-150253 | 7/2009 |
| JP | 2013007333 | 1/2013 |
| WO | WO 2000/079223 A2 | 12/2000 |
| WO | WO 2006/005401 A1 | 1/2006 |
| WO | WO-2006/045536 A1 | 5/2006 |
| WO | WO-2007/122206 A1 | 11/2007 |
| WO | WO-2008/037642 A1 | 4/2008 |
| WO | WO-2009/128016 A1 | 10/2009 |
| WO | WO-2010/055465 A1 | 5/2010 |
| WO | WO-2010/084475 A2 | 7/2010 |
| WO | WO 2010/113125 A1 | 10/2010 |
| WO | WO-2010/115970 A1 | 10/2010 |
| WO | WO-2010/116284 A2 | 10/2010 |
| WO | WO-2010/128844 A1 | 11/2010 |
| WO | VVO-2010/137952 A1 | 12/2010 |
| WO | WO-2011/000005 A1 | 1/2011 |
| WO | WO-2011/010263 A1 | 1/2011 |
| WO | WO-2011/113854 A2 | 9/2011 |
| WO | WO-2012/011053 A1 | 1/2012 |
| WO | WO-2012/013556 A1 | 2/2012 |
| WO | WO-2012/038063 A1 | 3/2012 |
| WO | WO-2012/045184 A1 | 4/2012 |
| WO | WO-2012/110323 A1 | 8/2012 |
| WO | WO-2012/118367 A1 | 9/2012 |
| WO | WO-2012/120459 A1 | 9/2012 |
| WO | WO-2012/122329 A1 | 9/2012 |
| WO | WO-2012/123857 A1 | 9/2012 |
| WO | WO-2012/144885 A1 | 10/2012 |
| WO | WO-2013/043048 A1 | 3/2013 |
| WO | WO-2013/046014 A1 | 4/2013 |
| WO | WO-2013/060654 A1 | 5/2013 |
| WO | WO-2013/060918 A1 | 5/2013 |
| WO | WO-2013/068242 A1 | 5/2013 |
| WO | WO-2013/079811 A | 6/2013 |
| WO | WO-2013/132435 A1 | 9/2013 |
| WO | WO-2013/135937 A2 | 9/2013 |
| WO | WO-2013/136209 A1 | 9/2013 |
| WO | WO-2013/136240 A1 | 9/2013 |
| WO | WO-2013/144838 A1 | 10/2013 |
| WO | WO-2013/153169 A2 | 10/2013 |
| WO | WO-2013/157927 A1 | 10/2013 |
| WO | WO-2013/164669 A1 | 11/2013 |
| WO | WO-2013/189923 A1 | 12/2013 |
| WO | WO-2013/190426 A1 | 12/2013 |
| WO | WO-2014/001584 A1 | 1/2014 |
| WO | WO-2014/012779 A2 | 1/2014 |
| WO | WO-2014/012783 A2 | 1/2014 |
| WO | WO-2014/033344 A1 | 3/2014 |
| WO | WO-2014/053638 A1 | 4/2014 |

(56) References Cited

FOREIGN PATENT DOCUMENTS

| | | |
|---|---|---|
| WO | WO-2014/067507 A2 | 5/2014 |
| WO | WO-2014/072942 A2 | 5/2014 |
| WO | WO-2014/076041 A1 | 5/2014 |
| WO | WO-2014/118812 A1 | 8/2014 |
| WO | WO-2014/125390 A1 | 8/2014 |
| WO | WO-2014/128315 A1 | 8/2014 |
| WO | WO-2014/167526 A1 | 10/2014 |
| WO | WO-2014/184651 A1 | 11/2014 |
| WO | WO-2014/184652 A1 | 11/2014 |
| WO | WO-2014/184653 A1 | 11/2014 |
| WO | WO-2014/191412 A1 | 12/2014 |
| WO | WO-2014/191413 A1 | 12/2014 |
| WO | WO-2014/198474 A1 | 12/2014 |
| WO | WO-2014/202105 A1 | 12/2014 |
| WO | WO-2015/011683 A1 | 1/2015 |
| WO | WO-2015/056202 A1 | 4/2015 |
| WO | WO-2015/075584 A1 | 5/2015 |
| WO | WO-2015/082982 A1 | 6/2015 |
| WO | WO-2015/087180 A1 | 6/2015 |
| WO | WO-2015/101394 A1 | 7/2015 |
| WO | WO-2015/104171 A1 | 7/2015 |
| WO | WO-2015/104172 A1 | 7/2015 |
| WO | WO-2015/128527 A1 | 9/2015 |
| WO | WO-2015/128799 A1 | 9/2015 |
| WO | WO-2015/128827 A1 | 9/2015 |
| WO | WO-2015/180960 A1 | 12/2015 |
| WO | WO-2016/041596 A1 | 3/2016 |

OTHER PUBLICATIONS

Chinese Office Action (and English translation), App. No. 201580011291.7 (dated Feb. 19, 2019).

Notice of the Reasons for Rejection dated Sep. 3, 2021; Japanes Patent Application No. 2020-171543 with English translation (11 pgs.).

English-language translation of Japanese Office Action, App. No. 2016-544088, 8 pages (dated Oct. 30, 2019).

English translation of Decision of Rejection; Japanese Patent Applicaiton No. 2016-544088, dated Jun. 9, 2020 (4 pgs.).

* cited by examiner

EXCHANGEABLE SUPPLY PACK FOR A BEVERAGE DISPENSING MACHINE, DOSER, PUMP ASSEMBLY AND METHOD OF MANUFACTURING

CROSS-REFERENCE TO RELATED PATENT APPLICATIONS

The present application is a continuation of International Patent Application No. PCT/NL2015/050002, filed on Jan. 2, 2015, which claims priority to Netherland Patent Application No. NL2012043, filed Jan. 3, 2014, all of which are incorporated herein by reference in their entirety.

BACKGROUND

The invention relates to an exchangeable supply pack for a beverage dispensing machine, a dosing unit, a pump assembly and a method of manufacturing an exchangeable supply pack.

Service providers of beverages distribute their beverages mostly via automated dispensers in offices, public venues and other locations. Such beverage dispensing machines can include coffee machines for preparing hot beverages or post mix juice dispensing or vending machines for such products. Enhancing the ease of use when operating these beverage dispensing machines is crucial, not only for the consumer but also for the supplier. In the supply process, service providers are challenged to minimize human interference and maximize the degree of automation, for reasons of costs, efficiency and failure reduction.

SUMMARY

The present invention relates to a robust, easy-to-use, failsafe and cost effective system for the support of the automated process of supplying beverages. This system is based on the use of exchangeable supply packs. These exchangeable supply packs are ingredient container packages that provide the system with a required ingredient or ingredients for preparing a beverage offered by the system. The ingredient is a liquid substance which may include but is not limited to coffee extracts, tea extracts, chocolate beverages, milk, flavors, juices, and/or concentrates thereof. An example of an exchangeable supply pack is a bag-in-box pack. Such an exchangeable supply pack is equipped with a dozer that includes a (system operated) pump assembly for providing a desired dosage of the ingredient in use. Such a pump assembly may include a gear pump.

Gear pumps are a type of pumps usually formed by multiple engaging gears arranged inside a pump channel. The number of engaging gears is usually two, although gear pumps with more than two engaging gears are also available. Different types exists for example based on two engaging external gears within a closely fitting pump chamber (i.e. an external gear pump), or an internal gear rotating around an external gear (i.e. an internal gear pump). The gear pump is based on the principle of moving pockets of fluid trapped between two consecutive teeth of the gears. In an external gear pump, which is based on two engaging external gears, pockets of fluid are transported between consecutive teeth running closely past the walls of a pump chamber arranged inside a channel. The fluid is released when the gears have made approximately halve a revolution, just before the teeth of the two gears re-engage again at the engagement point of the gears, of course depending on the shape of the pump chamber and channel.

A gear pump is a pump with a fixed displacement. Every revolution the area between the teeth of the gears is displaced. The most common gear pump type is the external gear pump. The present invention relates to the use of a gear pump assembly in a doser of an exchangeable supply pack for a beverage dispensing machine. The gear pump has some advantages and disadvantages with respect to such a doser. The advantages are that a gear pump can be very small, the principle is simple and the pump is reliable and efficient. Furthermore, the pump is suitable for a wide viscosity range and is self priming.

The disadvantages are that a gear pump needs to be manufactured and assembled precisely to prevent leakage. For example, the gear pump requires at least one of the gears to be a driving gear which receives a driving torque from the beverage dispensing machine for operating the pump. The other gear or gears may be driven by the driving gear, and are not operated by the beverage dispensing machine. With such a type of gear pump, leakage has been discovered along the driving shaft and driving axle. This causes the pump to be less efficient in properly dosing the ingredient, thereby diminishing the quality of the beverage prepared. Moreover, the leaked fluid could lead to hygiene related problems in the machine and/or in the exchangeable supply pack, or may cause further problems such as clogging, wear and/or electrical problems in the machine.

It is an object of the present invention to resolve the disadvantages referred to above, and provide a pump assembly for use in a doser of an exchangeable supply pack designed to alleviate the problem of fluid loss due to leakage effectively.

The present invention therefore, in accordance with a first aspect, provides for an exchangeable supply pack for a beverage dispensing machine, wherein the exchangeable supply pack comprises a doser including a pump assembly, the pump assembly comprising a pump channel between an inlet and an outlet for receiving a fluid from an ingredient container of said pack and for pumping the fluid to the outlet, the pump assembly further comprising a pump chamber and at least two mutually engaging gears forming a gear pump arranged in said pump chamber, wherein at least one of said gears forms a driving gear, the driving gear comprising a shaft opening for receiving a driving axle of the beverage dispensing machine for operating the gear pump, wherein the shaft opening coincides with an axle reception opening of a support wall of the pump chamber, and wherein a flexible seal is arranged at least between the driving gear and the support wall, wherein the seal comprises a through opening coinciding with the shaft opening and the axle reception opening for receiving the driving axle.

The use of a gear pump in a doser of an exchangeable supply pack in accordance with the present invention has advantages. The advantages are that a gear pump can be very small, the principle is simple and the pump is reliable and efficient. Furthermore, the pump is suitable for a wide viscosity range and is self priming. In the present invention, leakage from the doser by fluid penetrating underneath the driving gear has been prevented by adding a seal between the gear and the support wall. The seal is made of flexible material and is sufficiently compressed in between the gear and the support wall to prevent such leakage. It has been found that adding the seal directly in between the driving gear and the support wall allows to provide a shaft opening and axle receiving opening in the support wall for easily receiving an external driving shaft from the beverage dispensing machine, while at the same time leakage may be sufficiently reduced, while friction between the gear and the seal remains acceptable.

The driving gear in a pump assembly in a doser in an exchangeable supply pack of the invention, may in accordance with an embodiment comprise a circumferential rim surrounding the shaft opening for locally compressing the seal against the support wall for preventing leakage of the fluid through the through opening of the seal. The flexible seal present in between the driving gear and the support wall is locally compressed circumferentially around the shaft opening by the rim which is present on the driving gear. The rim is located on the driving gear facing the flexible seal and compressing it slightly, such that due to the elevated pressure in the material of the flexible seal between the rim and the support wall the flexible seal is sufficiently deformed such as to prevent leakage along the shaft and driving axle.

In the pump assembly of the present invention, the flexible seal present in between the gears and the support wall presses the gears in a close fit to the walls of the pump channel. This reduces axial play of the gears preventing internal leakage from the high pressure to the low pressure side of the pumps (i.e. from the outlet to the inlet side). However, to further prevent leakage along the shaft and driving axle of the driving gear, the driving gear is provided with the circumferential rim around the shaft opening. Due to the elevated pressure in the flexible seal near the rim, leakage of fluid past the rim to the shaft opening of the gear and through opening of the flexible steal can be effectively prevented. At the same time, the rim does not prevent operation of the gear pump due to increased friction and wear. This is in particular (but not exclusively) the case when the rim is properly dimensioned and/or shaped as will be explained further below.

In the present invention, the driving gear, the flexible seal and the support wall cooperate to provide a construction wherein fluid leakage from the pump channel to the shaft opening and through opening and via a driving axle may be effectively prevented. It is the flexible seal which is, in accordance with an embodiment, compressed between the rim on the driving gear and the support wall supporting the flexible seal underneath. Due to this compression, a ring shaped circumferential area around the through opening in the flexible seal will have an elevated pressure that prevents fluid from penetrating this area and reaching the through opening.

As referred to above, proper dimensioning and shaping of the circumferential rim on the drive gear provides further advantages to the present invention. In particular, by properly dimensioning and shaping the rim, friction can be reduced sufficiently to prevent wear to the gear while at the same time ensuring an effective seal for sealing the shaft opening. For example, by arranging the rim concentrically around the shaft opening in rotation symmetry therewith, in accordance with an embodiment, friction between the rim and the flexible is minimized in operation of the driving gear. In a pump assembly for use in a doser in an exchangeable supply pack for beverage dispensing machines in accordance with the present invention, as will be appreciated the dimensions of the gears in the pump channel will be dependent on a number of factors such as the interface with the beverage dispensing machine wherein the doser should fit, the amount of fluid to be pumped in a single dose and a number of flow related physical parameters. The dimensions of the circumferential rim will be dependent on the specifics of the pump assembly, such as the size of the gears or the thickness or material parameters of the flexible seal. It has been found that optimal performance of the pump assembly in terms of reducing leakage along the shaft and driving axle may be obtained by proper dimensioning of the height of the rim. In this context, the height of the rim may be defined as the height of the pitch of the rim as measured from the end surface of the gear on which the rim is arranged. For gears having a pitch diameter of the pitch circle of 5-10 mm and for example a gear height (the size of the gear between the end phases) of similar size (5-10 mm) it has been found that the height of the rim is preferably between 0.1 and 0.3 mm, more preferably between 0.15 and 0.25 mm and even more preferably approximately 0.2 mm. Divided by the height of the driving gear, this range may be defined as between 0.015 and 0.045, or preferably between 0.022 and 0.037, and even more preferably approximately 0.029.

Moreover, the shape of the rim may be optimized to lower friction cost by the rim and to approve its sealing function. It has been found that the rim may have rounded edges, for example such as to obtain a cross section across a radial direction relative to the shaft opening of the driving gear, which cross section is clock shaped. As may be appreciated, other alternatives with rounded edges, such as squires or rectangles with rounded edges may be applied alternatively.

Further optimization of the pump assembly of the present invention may be obtained by carefully selecting the flexible material of which the flexible seal is made. It is also preferred that the flexible material is food compliant. The flexible seal, in accordance with a specific embodiment, is made of a flexible material comprising silicone, preferably a liquid silicone rubber. It has been found that a flexible material having a shore A hardness between 35 and 65 provides good results. This material could for example be a liquid silicone rubber such as Silopren® LSR 2640, LSR 2650 or LSR 2660. Although other flexible materials having a similar hardness may be applied, optimal results have been obtained with the abovementioned materials.

The support wall of the pump assembly should be sufficiently robust and strong to enable compression of the flexible seal between the rim and the support wall. The support wall may, in accordance with an embodiment, for example comprise one or more reinforcement ribs such as to increase the robustness thereof. For example, reinforcement ribs may comprise at least a first circumferential support rib arranged underneath the rim of the driving gear, and cooperating with the rim for further compressing the flexible seal for preventing leakage between the seal and the support wall. Relative to the flexible seal, the circumferential rim on the driving gear and the circumferential support rib on the support wall may be on opposite sides such as to cooperate for compressing the seal.

In addition to the abovementioned first circumferential support rib, further support ribs may be present on the support wall. For example, the reinforcement ribs on the support wall may form a reinforcement web. To this end, the reinforcement ribs may further comprise further ribs such as any of the reinforcement ribs mentioned below. The reinforcement ribs may for example comprise a second circumferential support rib arranged underneath a further gear of the at least two gears of the pump assembly. Such as second circumferential support rib may for example be circumferentially arranged around a notional rotation axis of the further gear. Connecting ribs may be present in between such a second circumferential support rib and the first circumferential support rib and any other of the reinforcement ribs. As a further option, the reinforcement ribs may comprise an outer reinforcement rib which is circumferentially arranged around all the other reinforcement ribs, i.e. at a periphery of the reinforcement web underneath one or more of the side walls of the pumping channel. Moreover, further reinforcement ribs may improve the sealing of parts of the pumping channel. For example one or more reinforcement ribs may be formed and arranged such as to connect a first location, a second location and a third location with the reinforcement web. Herein, the first location corresponds with an engagement location of the gears, the second location corresponds with a contact location between the driving gear and the pumping channel, and a third location corresponds with a contact location between the further gear and the pumping channel. The choice of the three locations on the side of the support wall may be understood as follows. In operation of the gear pump, the driving gear, by applying a force on the driven gear, has the tendency to move towards the high pressure side of the pump (i.e. the outlet side). At the same time, by being driven, the driven gear has a tendency of being forced towards the low pressure side of the pump. Therefore, sealing between the low pressure side and the high pressure side may effectively be obtained by sealing of the location at which the gears engage (the first location), the location near the high pressure side of the pump assembly where the teeth of the driven gear tend to make contact with the channel wall (the second location), and the location near the low pressure side of the pump where the teeth of the gear tend to contact the walls of the pump channel (the third location). By providing a reinforcement rib construction which connects these three locations, internal sealing of the gear pump will be optimized, while at the same time providing sufficient robustness to the support wall to seal the driving gear circumferentially around the shaft opening such as to prevent leakage along the shaft and driving axle. Moreover, and further optional, auxiliary reinforcement ribs that may connect any of the other reinforcement ribs to the abovementioned outer reinforcement rib on the periphery of the web may be provided for stability of the construction and to prevent any vibrations of the support wall upon operation of the pump assembly. The support wall of the pump assembly according to this embodiment may have one or more, or even all of the above reinforcement ribs together forming the reinforcement web.

With reference to the above the reinforcement ribs or reinforcement web formed therewith may be an integral part of the support wall, or alternatively may be provided as an additional construction thereto, as will be appreciated by the skilled person. In fact, the support wall comprising the ribs may be an integral part of a bottom housing that forms the pumping channel in cooperation with a pump housing, or may be provided as a separate support plate.

In accordance with a further embodiment of the present invention, the pump assembly may comprise one or more pressure relief grooves that are arranged near an engagement location of the at least two gears for releasing fluid trapped between the at least two gears in use. Such pressure relief grooves may be arranged in a wall of the pumping channel near the end phases of the gears or in the flexible seal underneath the teeth. By pumping, upon reengagement of the teeth near the engagement location, fluid present between the teeth of the gears may become trapped between these teeth, and the engaging tooth of the other gear. Such trapping of fluid not only hampers the operation of the gear pump, but may also increase the chance on leakage of fluid internally in the pump or via the driving axle to the outside. Therefore, by providing at least one, but preferably at least two pressure relief grooves, any fluid which is trapped between the teeth will be provided with an outflow opening.

Such pressure relief grooves may be arranged approximately from the engagement location above or underneath the gears to a location more remote therefrom. The pressure relief grooves, where two (or more) pressure relief grooves are applied, may be located either on the high pressure side or the low pressure side of the pump. A direct connection between the high and low pressure sides may preferably be prevented by not extending the pressure relief grooves to or past the engagement point, so that a sealing ridge is formed between pressure relief grooves at the low and high pressure sides. This prevents internal leakage through the pressure relief grooves themselves.

According to a further embodiment of the present invention, the pump assembly comprises a pump housing and a bottom housing, wherein the pump housing and the bottom housing are correspondingly shaped such as to enable engagement of the pump housing and bottom housing for forming the pump channel, wherein the support wall of the pump channel is provided by the bottom housing and wherein the flexible seal is arranged contiguous to the bottom housing and is correspondingly shaped with the pump channel such as to seal the pump channel and the connection between the bottom housing and the pump housing. A pump assembly in accordance with the present invention may be conveniently provided and manufactured using such as bottom housing and pump housing structure as described herewith. As will be appreciated, the invention is not limited to the use of a bottom housing and pump housing structure as described, and the skilled person may recognize alternative constructions that provide the same functionality. In accordance with this present embodiment, to seal the pump channel and the connection between the bottom housing and the pump housing, the flexible seal which is arranged contiguous to the bottom housing is correspondingly shaped in the form of the pump channel such as to provide a close fitting with the pump housing and bottom housing for the purpose of sealing.

The invention further relates to a doser for use in an exchangeable supply pack for beverage dispensing machine which doser comprises a pump assembly as described above. Moreover, the invention according to a further aspect relates to a pump assembly for use in an exchangeable supply pack in accordance with a first aspect.

The invention, in accordance with a further aspect, relates to a method of manufacturing a new exchangeable supply pack for use in a beverage dispensing machine by re-using of a doser from a used exchangeable supply pack in accordance with the first aspect. This method may comprise the steps of providing an ingredient container including a doser receiver for receiving a doser for fixing thereof to the container, wherein the container comprises an ingredient for the beverage dispensing machine. The method further comprises a step of removing a doser from the used exchangeable supply pack, and fixing the doser to the ingredient container by means of the doser receiver for providing the new exchangeable supply pack.

The doser may be removed from the exchangeable supply pack by cutting or breaking of the doser receiver present on the used exchangeable supply pack to which the doser is fixed. For example by destruction of the doser receiver the receiver may release the doser from the used exchangeable supply pack, after which the doser may be re-used for fabricating the new exchangeable supply pack.

In accordance with a further embodiment, the doser receiver includes a spout and the doser is removed by cutting of the spout of the used exchangeable supply pack.

The invention in accordance with a further aspect thereof relates to a system for dispensing of beverages, including a beverage dispensing machine comprising a loading channel, and an exchangeable supply pack in accordance with the first aspect, the exchangeable supply pack comprising a doser including a pump assembly comprising at least two engaging gears forming a gear pump, wherein at least one of the at least two gears forms a driving gear comprising a shaft opening, the beverage dispensing machine further comprising a driving axle, the driving axle being arranged for extending thereof into an axle reception opening of the doser and into the shaft opening for engaging with the driving gear, wherein a flexible seal is arranged at least between the driving gear and the support wall, and wherein the seal comprises a through opening coinciding with the shaft opening and the axle reception opening for receiving the driving axle.

BRIEF DESCRIPTION OF THE DRAWINGS

The invention is further described by means of some specific embodiments thereof, with reference to the enclosed drawings, wherein.

DETAILED DESCRIPTION

Figure 1:
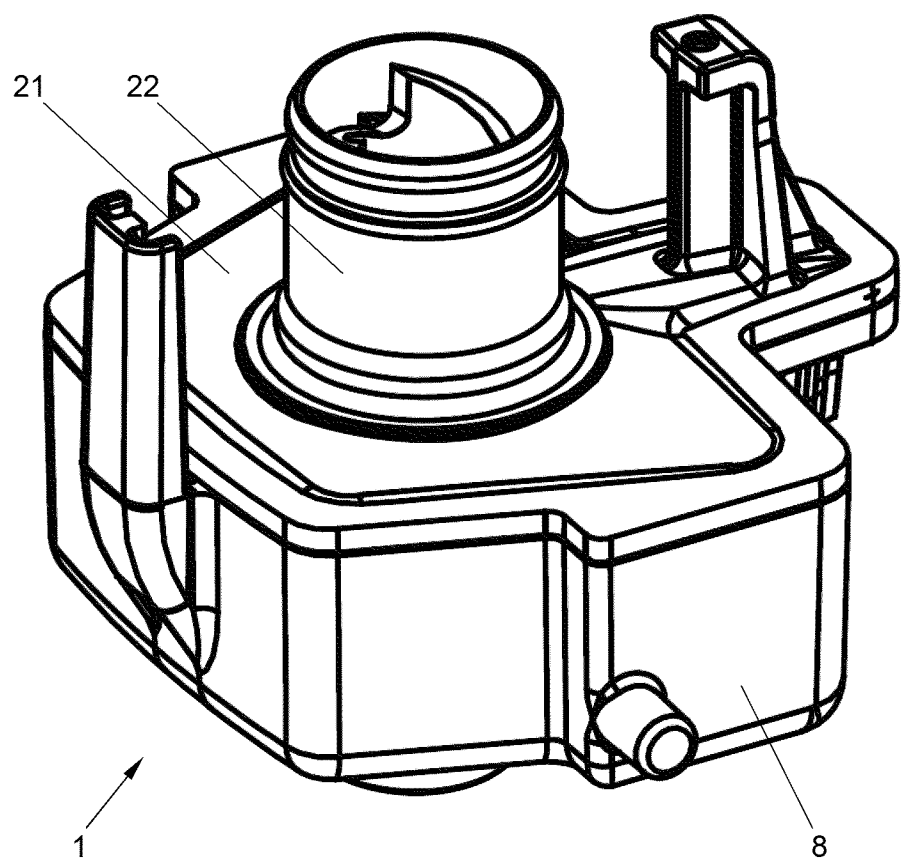
FIG. 1 schematically illustrates a doser used in a exchangeable supply pack in accordance with the present invention.
Figure 2A:
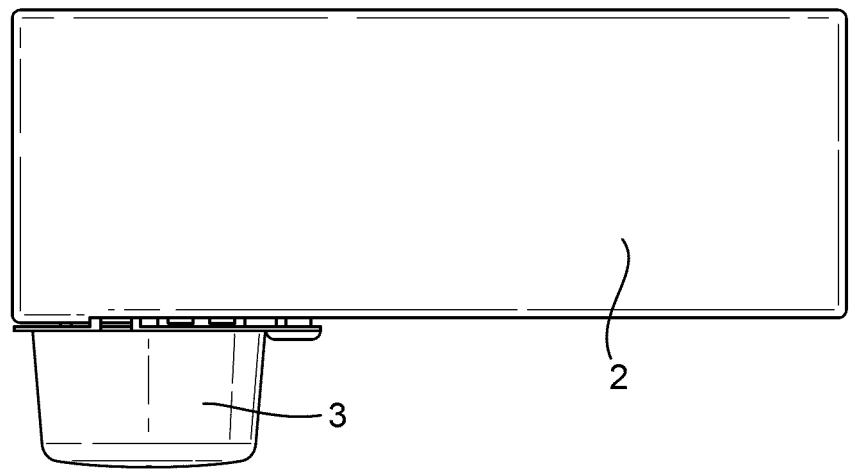
FIGS. 2A and 2B schematically illustrate the exchangeable supply pack of the invention (FIG. 2A) and the doser attached thereto (FIG. 2B, in cross section)

FIG. 1 illustrates a doser 1 for use in a exchangeable supply pack 2 (FIG. 2A) for a beverage dispensing machine. The exchangeable supply pack 2 is an ingredient container package that includes a container 9 for holding an ingredient of a beverage that may be offered by the beverage dispensing machine. The container may comprise an outer casing and a bag (not shown) comprising the ingredient, i.e. a liquid substance, a so-called bag-in-box pack. The doser 1 is attached to one side of the exchangeable supply pack 2, and includes a pump assembly. The pump assembly enables to take a desired dosage of the ingredient from the container 9 inside the package 2 to provide it to the beverage dispensing machine for preparing a beverage. Prior to use of the exchangeable supply pack 2, the doser 1 may be protected by a protective part 3 visible in FIG. 2A.

Figure 2B:
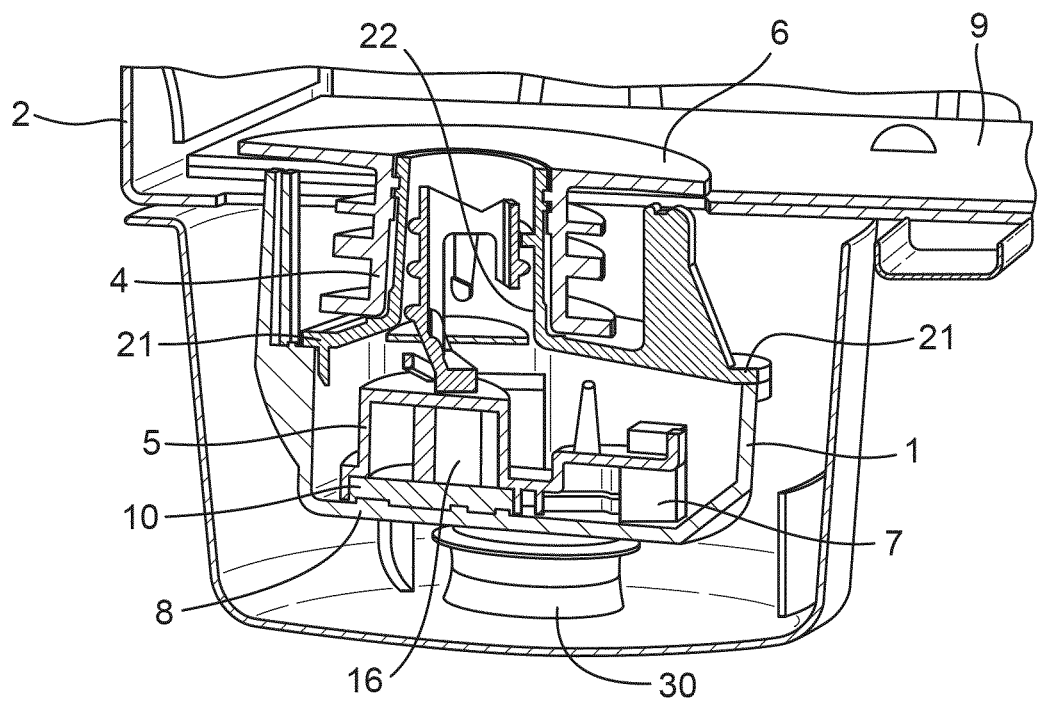

In FIG. 2B, which illustrates a cross section of the exchangeable supply pack including the doser 1, it can be seen how the doser 1 is attached to the exchangeable supply pack 2. The doser 1 comprises a top cap 21 including an adapter 22 which is inserted into a spout 4 that is fixed with the container 9 of the pack 2. Inside the container 9, the spout 4 is attached by means of a spout ring 6. When a bag is present inside the container, this bag is attached to the spout ring 6.

The spout 4 of the exchangeable supply pack 2 may be shaped correspondingly with the adapter 22 such as to fix the adapter and therewith the doser 1 to the exchangeable supply pack 2. Additionally, the spout may further be shaped to seal the connection between the spout 4 and the adapter 22 such as to prevent leakage of the ingredient out of the container 9 in use.

The doser 1 includes a pump channel 5 which is formed by a pump housing 7 and a bottom housing 8. The pump housing 7 and the bottom housing 8 may be correspondingly shaped such as to enable engagement there between for forming the pump channel 5. The pump channel at least includes a pump chamber 11 (see FIG. 3) which includes a gear pump 16. Using the gear pump 16, the ingredient is transported from the container 9 to an outlet 30 of the doser 1.

Figure 3:
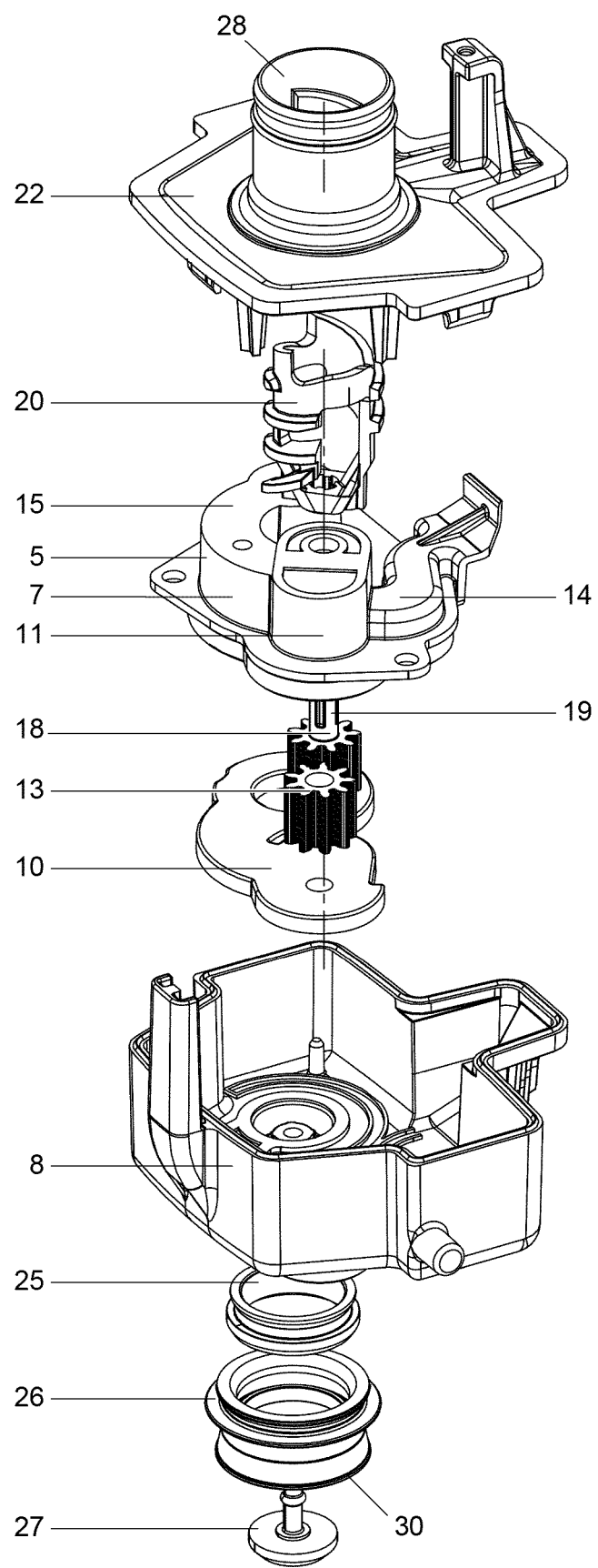
FIG. 3 is an exploded view of a doser comprising a pump assembly for use in an exchangeable supply pack in accordance with the present invention.

FIG. 3 provides an exploded view of a doser for using in an exchangeable supply pack 2 of the present invention. Visible in FIG. 3 are the adapter 22, the pump housing 7, and the bottom housing 8 of the doser 1. The pump chamber 11 includes two mutually engaging gears 13 and 18. The gears 13 and 18 are located in the pump chamber 11 closely fitting therewith, such as to provide the gear pump 16. The gear pump can be operated by operating the driving gear 13, which in turn will drive the driven gear 18 in counter rotation. Because the teeth of the gears 13 and 18 move closely past the inside of the walls of the pump chamber 11, the fluid is pumped from the inlet channel 14 to the outlet channel 15 of the pump channel 5.

In the assembled state (as in FIG. 1) the fluid is received through the inlet 28 at the open end of the adapter 22, and will flow to the interior of the bottom housing 8 of the assembly. From there, it will further flow into the inlet channel 14 until it reaches the pump chamber 11. When the gear pump is operated, the fluid is transported by the gears 13 and 18 to the outlet channel 15 towards the outlet 30. Near the outlet 30, the doser further includes a water jet mixer adapter ring 25 and a water jet mixer seal 26 for providing of the ingredient to the beverage dispensing machine. These elements 25 and 26 are not further discussed herein. The doser 1 further includes a valve 27 arranged in the outlet 30 for closing the doser, e.g. when not in use.

Inside the adapter 22, extending towards the inlet 28, is a piercer 20. The piercer serves to pierce a flexible foil of the container 9 (not shown in the figures) when the exchangeable supply pack 2 is installed in the beverage dispensing machine. The piercer unit 20 is operated via an internal axle 19 extending from the driven gear 18 through the pump housing 7 into the piercer 20. The piercer 20 is designed to be extended into the container 9 by piercing of the foil upon installation of the exchangeable supply pack 2, while at the same time retracting the piercer 20 may be prevented once it is extended.

Figure 4:
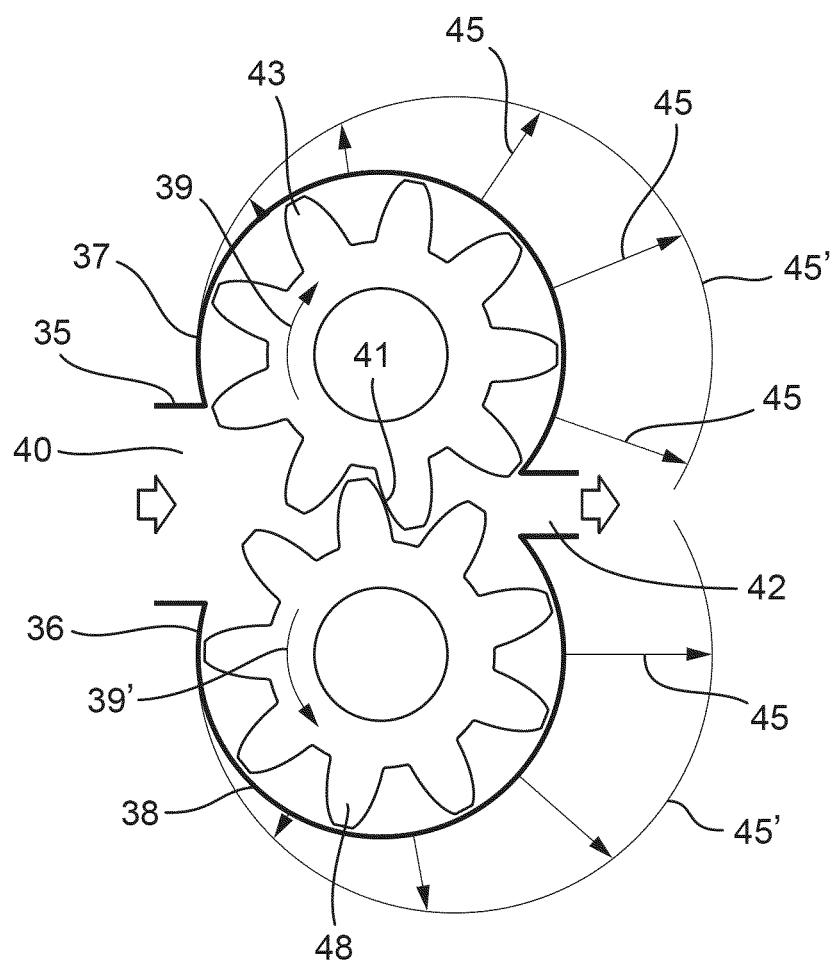
FIG. 4 schematically illustrates the principle of a gear pump.

FIG. 4 schematically illustrates the principle of an external gear pump. An external gear pump as shown in FIG. 4 includes a first gear 43 and a second gear 48. The first and second gear 43 and 48 mutually engage in the middle at an engagement point 41, and rotate inside a pump chamber 38. The pump chamber 38 of FIG. 4 comprises the chamber walls 36 and 37. The chamber walls 36 and 37 are shaped correspondingly with the gears 43 and 48 such that the teeth of the gears 43 and 48 move closely past the walls 36 and 37. Upon rotation, as indicated by arrows 39 and 39', pockets of fluid are transported in between each two consecutive teeth from the inlet channel 40 towards the outlet channel 42. The pressure at the walls 36 and 37 from the inlet channel 40 towards the outlet channel 42 gradually increases as indicated by the local pressure arrows 45. The end points of the arrows 45 define the pressure change over the walls 36 and 37, as indicated by circles 45' in FIG. 4.

The doser and pump assembly of the exchangeable supply pack of the present invention have been designed with measures to prevent leakage of fluid therefrom into the machine. This is in particular of interest because the gear pump of the doser in accordance with an embodiment is driven by means of an external driving axle that is extended from the beverage dispensing machine into the driving gear. To allow extending and engaging of the axle into the driving gear, access to the shaft opening of the driving gear will be provided via an opening providing some play to allow the axle to engage. Such an interface is difficult to seal directly on the axle itself, and requires a different design.

Figure 5B:
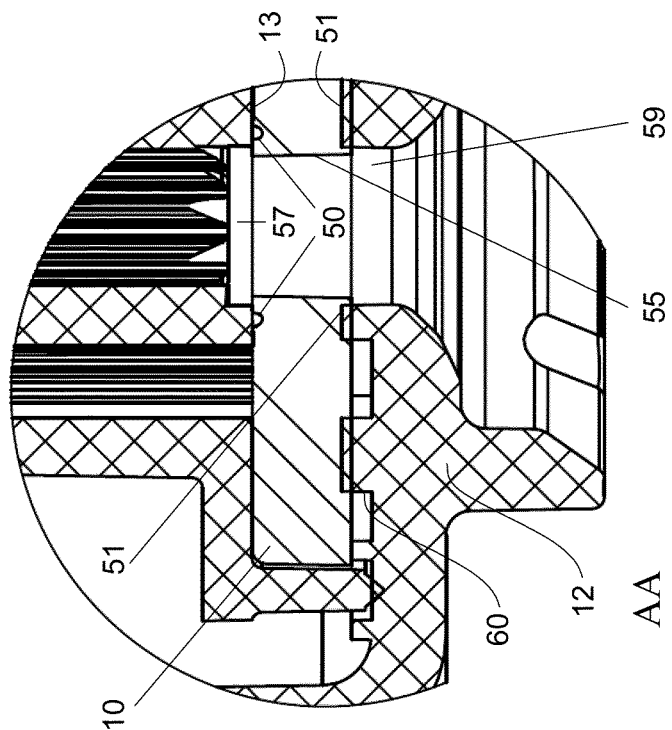
FIG. 5B provides an enlarged view of a part of FIG. 5A illustrated a driving gear, flexible seal and a support wall of the pump assembly.
Figure 5A:
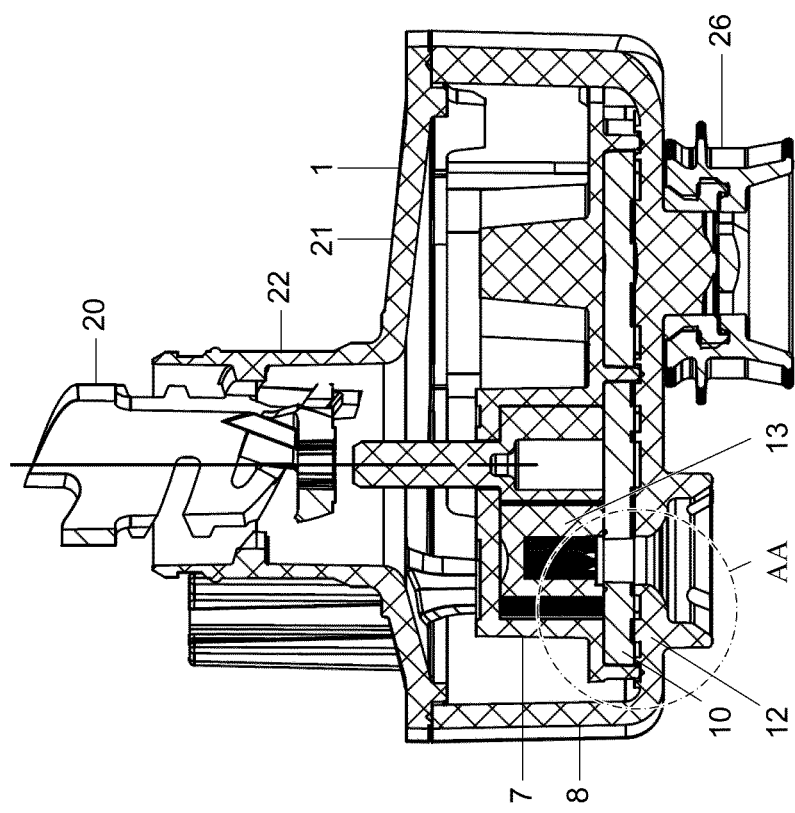
FIG. 5A illustrates a doser comprising a pump assembly in accordance with the present invention in cross section.
Figure 7:
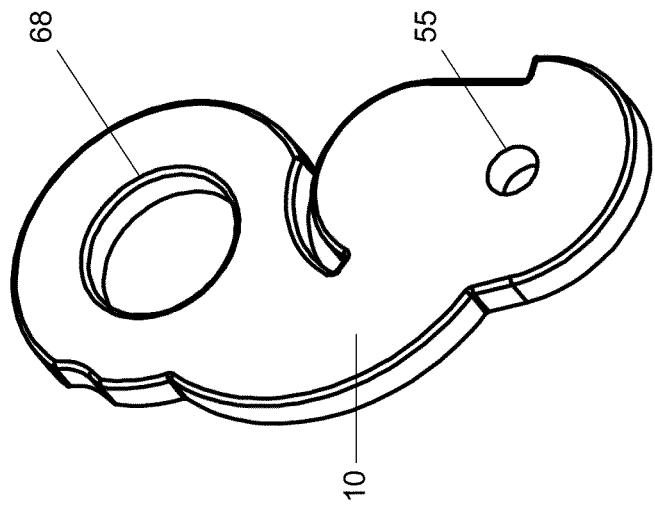
FIG. 7 illustrates a flexible seal for use in the pump assembly in accordance with the present invention.

The pump assembly inside the doser of the exchangeable supply pack of the present invention has been designed such as to prevent leakage of fluid along the driving axle driving the driving gear 13. This particular construction has been illustrated in more detail in FIGS. 5A and 5B. FIG. 5A is a cross section of the doser which shows the bottom housing 8 attached to the top cap 21 including the adapter 22. The doser 1 further includes the pump housing 7 which is attached to the bottom housing 8 to the interior of the doser 1. In between the driving gear 13 and the support wall 12 being formed integrally with the bottom housing 8, a flexible seal 10 is present to prevent leakage. The seal 10 for example seals the connection between the pump housing 7 and the bottom housing 8 forming the pumping channel and pumping chamber. The seal 10 further cooperates within the pumping assembly such as to prevent leakage along the shaft that will drive the driving gear 13. The flexible seal extends underneath and beyond the side walls of the channel 5 formed by pump housing 7 for at least a part of the periphery of the pumping chamber 11 and optionally also the outlet channel 15, such that the seal 10 is fixed in between the pump housing 7 and the bottom housing 8. The pump housing 7, as can be seen in FIG. 5A, is correspondingly formed to allow the extension of the seal 10 in between the bottom housing 8 and the pump housing 7.

In use, the gear pump of the doser 1 will be operated by a driving axle of the beverage dispensing machine. The driving axle of the beverage dispensing machine will extend through the axle reception opening 59 of the bottom housing 8, the through hole 55 of the flexible seal 10 into the shaft opening 57 of the driving gear 13. The interior of the shaft opening 57 of the driving gear 13 is shaped correspondingly with the driving axle of the beverage dispensing machine (not shown) to allow driving of the driving gear 13 by the machine.

Sealing of the pump assembly will primarily be achieved by means of the seal 10 and the proper dimensioning thereof. The seal 10 closely fits and is slightly compressed between the driving gear 13 and the support wall 12 to provide sealing. Further sealing of the shaft opening 57, the through hole 55 and the axle reception opening 59 is obtained by the driving gear 13 which is provided with a circumferential rim 50 around the shaft opening 57. The circumferential rim 50, shown in FIG. 5B in the enlarged view of area AA of FIG. 5A, is also illustrated in FIG. 6A.

Figure 6A:
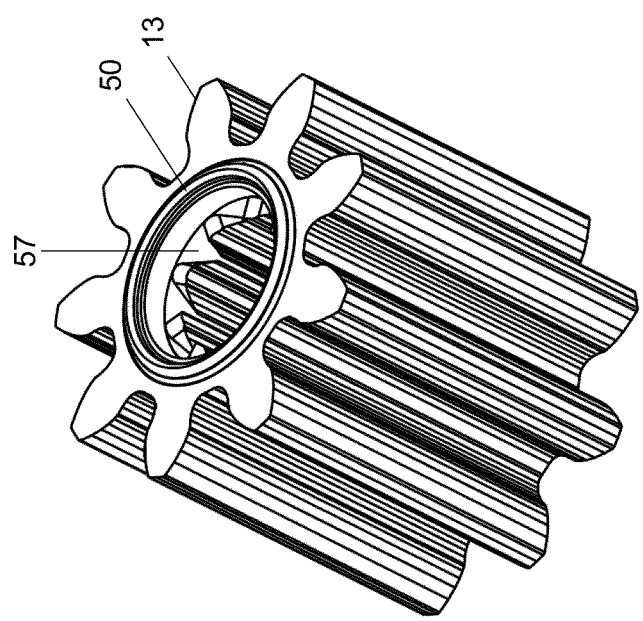
FIG. 6A illustrates a driving gear for using the pump assembly in accordance with the present invention.

FIG. 6A illustrates the driving gear 13 used in the pump assembly in the exchangeable supply pack 2 of the present invention. The driving gear 13 comprises the rim 50 which is arranged circumferentially around the shaft opening 57. The rim 50 further compresses the seal against the support wall 12, thereby locally elevating the pressure inside the flexible seal 10. This prevents fluid from penetrating between the seal 10 and the rim 50, thereby sealing the shaft opening 57.

Figure 6B:
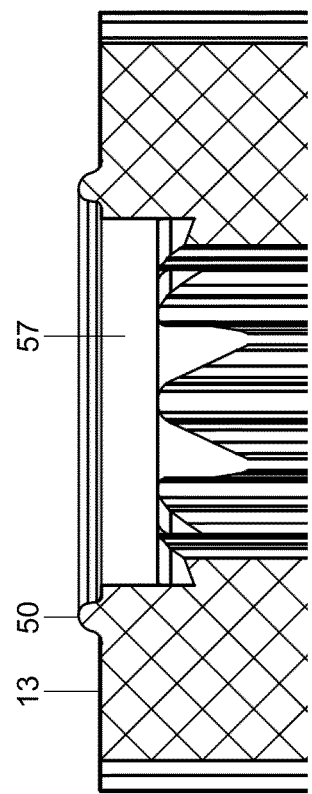
FIG. 6B illustrates a part of the driving gear of FIG. 6A in cross section, particularly illustrating the shaft opening.

In cross section, as is shown in FIG. 6B, the rim 50 is provided with rounded edges. Upon operation of the driving gear 13 the proper shaping of the rim 50 prevents friction to become unnecessarily large, allowing the driving gear 13 to be operated without hampering. Moreover, the circumferential ring 50 is concentrically shaped in rotation symmetry relative to the shaft opening 57. This also prevents unnecessary friction between the driving gear 13 and the seal 10. Dependent on the height of the driving gear, the height of the rim (as measured from the base of the rim at the end surface of the gear to the pitch of the rim 50) may be carefully selected. The height of the rim divided by the height of the gear may be between 0.015 and 0.045, more preferably between 0.022 and 0.037 and even more preferably approximately 0.029. For example, if the driving gear 13 has a height of 6.79 mm, the height of the rim may be 0.2 mm. The rim 50 compresses the flexible seal 10 against the support wall 12, and thereby increases the internal pressure in the seal such as to seal the shaft opening 57 from the pump channel. This prevents fluid from the pump channel 5 and pump chamber 11 to penetrate between the seal 10 and the gear 13 to reach the shaft opening 57.

Figure 8:
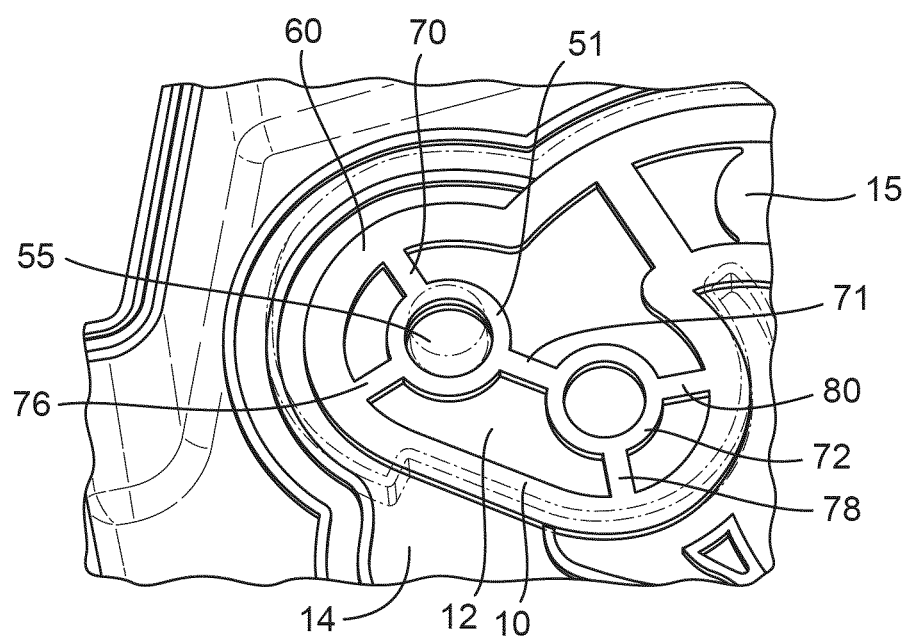
FIG. 8 illustrates the bottom housing of a doser comprising the pump assembly of the present invention, particularly illustrating the support wall of the pump channel.
Figure 9:
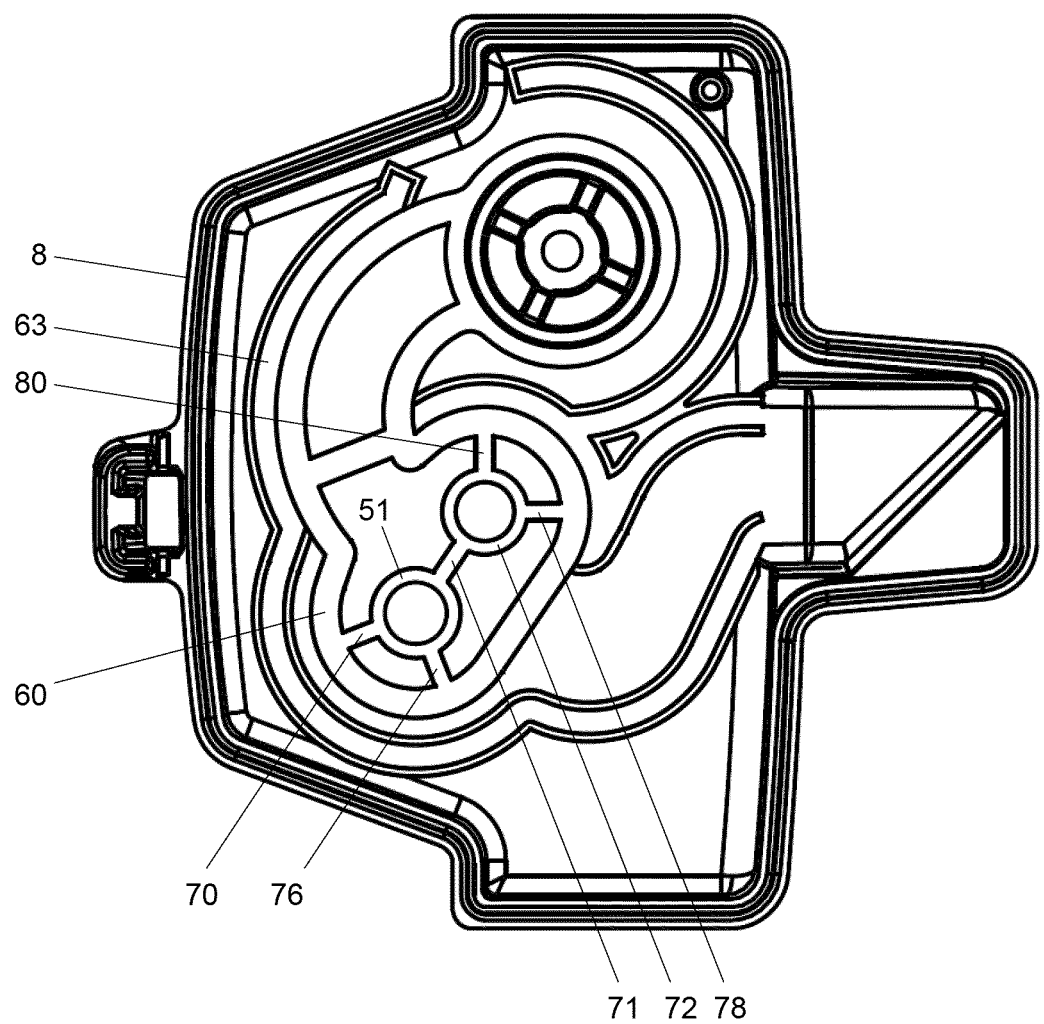
FIG. 9 provides a top view of the bottom housing of FIG. 8.

As a further improvement to prevent leakage, the support wall 12 may be provided with a circumferential support rib 51 around the axle reception opening 59. The circumferential rib 51 in the support wall 12 cooperates with the seal 10 and the rim 50 to further locally compress the seal 10, such as to further seal the pump assembly. The circumferential support rib 51 may be part of a reinforcement web of a plurality of reinforcement ribs located in the support wall 12. These reinforcement ribs and the reinforcement web formed are for example illustrated in FIGS. 8 and 9. In these figures, the circumferential reinforcement rib 51 is illustrated circumferentially around the through hole 55 of the seal (and its coinciding axle reception opening 59 (not shown in FIG. 8)). The web further comprises a second circumferential support rib 72 underneath the driven gear 18 and an outer reinforcement rib circumferentially arranged at a periphery of the reinforcement web underneath the side walls of the pumping channel or pumping chamber. The outer reinforcement rib is illustrated in FIGS. 5B, 8 and 9 as rib 60.

Upon operation of the gear pump 16, the driving gear 13 will engage on the driven gear 18 at the engagement point. The point of engagement is approximately arranged (relative to the support wall 12) in between the first circumferential support rib 51 and the second circumferential support rib 72 (similar as in FIG. 4). By driving the driven gear 18, the forces on the driving gear 13 will be such that the driving gear 13 is slightly forces into the direction of the outlet channel 15. As a result, in operation there will be more play between the teeth of the driving gear 13 and the walls of the pump chamber formed by the pump housing 7 near the inlet channel 14 then near the outlet channel 15. The teeth of the driving gear 13 may contact the walls of the pump chamber 11 on the side walls of the pump chamber towards the outlet channel 15. Similarly, the driven gear 18 is slightly forced towards the inlet channel 14, and has a similar contact point on the side walls somewhere near the inlet channel 14. Study of the reinforcement rib arrangements forming the reinforcement web of a support wall of the present invention, has learned that internal leakage of the gear pump may be reduced by making a connection with reinforcement ribs underneath the gear pump between the contact points of the gears on the sidewalls of the pump channel and the engagement point of the gears. Therefore, the ribs 70, 71, and 78 attach the first circumferential support rib 51 and the second circumferential support rib 72 to the outer reinforcement rib 60 of the reinforcement web. Moreover, to increase stability and prevent vibration of the construction in use, auxiliary reinforcement ribs 76 and 80 are added to the reinforcement web as indicated in FIGS. 8 and 9. The outer reinforcement rib 60 may be extended along the pump channel at a periphery of the pump channel, preferably comprising one or more bridging ribs to prevent any additional leakage between seal and bottom housing. Further improvement of the pump assembly in an exchangeable supply pack of the present invention is obtained by proper selection of the flexible material for the flexible seal 10. The skilled person will appreciate that the flexible seal may be made of any suitable material that provides sufficient flexibility and sealing, whilst providing acceptable properties with respect to friction between the gear 13 and the seal 10. Preferably, the flexible material may have a shore A hardness between 35 and 65. A flexible seal may be preferably made of a material comprising a silicone, preferably a liquid silicone rubber. Materials that have been found to be particularly suitable are liquid silicone rubbers available by the name of Silopren® LSR2640, LSR2650 or LSR2660. These materials have found to provide excellent sealing ability combined with sufficiently low friction between the gear 13 and the seal 10, as well as being food compliant.

The invention, in accordance with a further aspect, relates to a method of manufacturing a new exchangeable supply pack for use in a beverage dispensing machine by re-using of a doser from a used exchangeable supply pack. This method may comprise the steps of providing an ingredient container including a doser receiver for receiving a doser for fixing thereof to the container, wherein the container comprises an ingredient for the beverage dispensing machine. The method further comprises a step of removing a doser from the used exchangeable supply pack, and fixing the doser to the ingredient container by means of the doser receiver for providing the new exchangeable supply pack.

The doser may be removed from the exchangeable supply pack by cutting or breaking of the doser receiver present on the used exchangeable supply pack to which the doser is fixed. For example by destruction of the doser receiver the receiver may release the doser from the used exchangeable supply pack, after which the doser may be re-used for fabricating the new exchangeable supply pack.

In accordance with a further embodiment, the doser receiver may include a spout, such as spout 4 in FIG. 2B, and the doser is removed by cutting of the spout of the used exchangeable supply pack. In the exchangeable supply pack 2 of FIGS. 2A and 2B, for example, cutting of the spout 4 may release the adapter 22 of the top cap 21 of the doser 1. Thereby, the doser 1 may be re-used for creating a new exchangeable supply pack.

Figure 10:
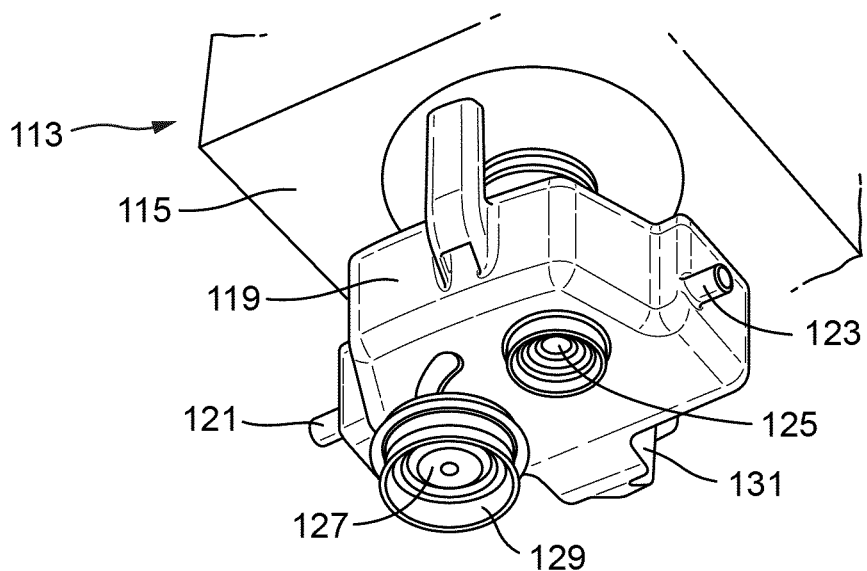
FIG. 10 illustrates an embodiment of an exchangeable supply pack of the invention.

FIG. 10 shows the protruding doser 119 of an exchangeable supply pack or cartridge 113, similar to doser 1 described hereinabove. The doser 119 has lateral pivot stud projections 121, 123 on opposite lateral sides. On a bottom face of doser 119 are a drive port 125 and an ingredient outlet port 127. The drive port 125 comprises an axle reception opening 59 as mentioned hereinbefore. The ingredient outlet port 127 is provided with a flexible resilient annular seal 129 (a water jet mixer seal). The doser 119 further includes a protruding housing portion 131 of the bottom housing 8.

Figure 11:
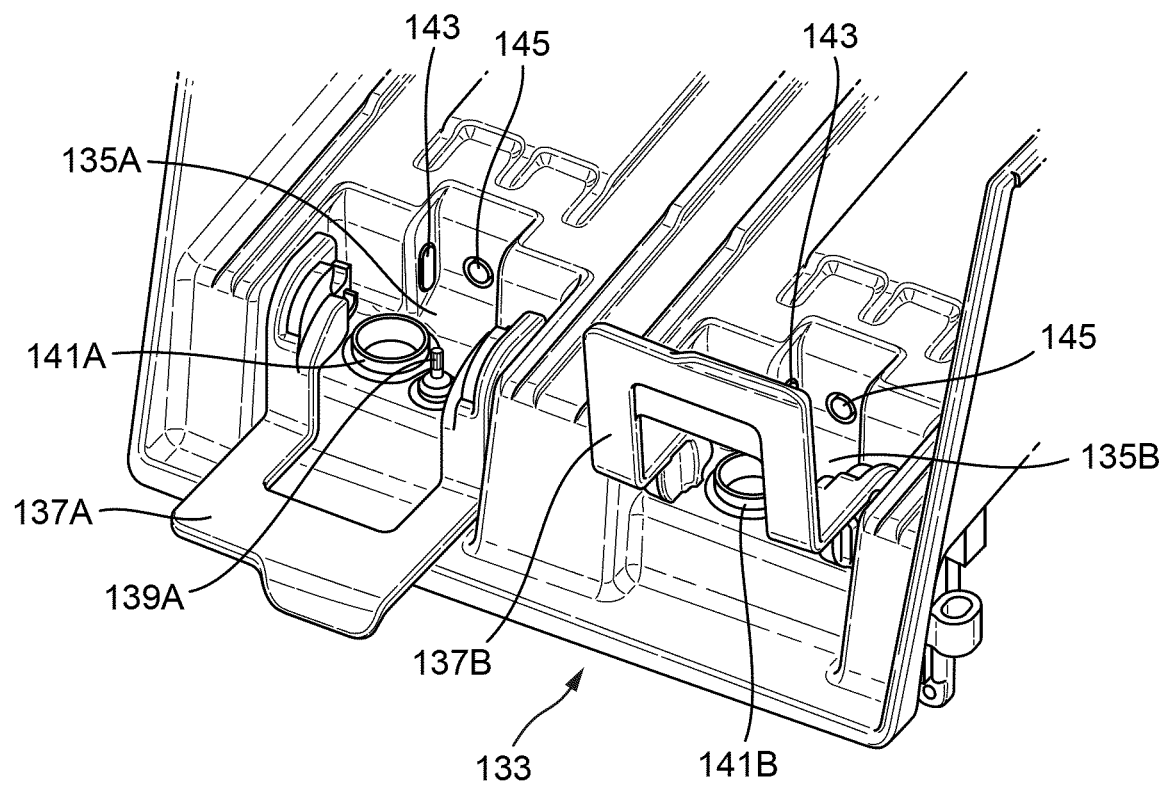
FIG. 11 illustrates a loading channel of a beverage dispensing machine arranged for receiving an exchangeable supply pack in accordance with the invention.

A detail of a loading channel 133 inside a cartridge compartment of a beverage dispensing machine or appliance is shown in FIG. 11. This loading channel 133 may normally be behind the front hatch of the appliance (not shown, but conventional). The loading channel 133 illustrated in FIG. 11 is arranged for receiving two cartridges 113, or mutually different cartridges equivalent to the exchangeable supply pack 2, in a side-by-side relationship. Each cartridge 113 (or supply pack 2) will be inserted with its doser 119 (or 1) in a trailing position and as seen in FIG. 11 the loading channel 133 has first and second cavities 135A, 135B. The first and second cavities 135A, 135B are for accommodating the respective doser 119 of a cartridge 113 inserted in the left or right hand part of the loading channel 133. Each of the cavities 135A, 135B is extended by a recess for receiving the housing portion 131 of the doser 119. Sensors 143, 145 are arranged in the recessed extensions of the cavities 135A, 135B to detect correct cartridge positioning, as well as product availability in the cartridge 113 through the housing portion 131. Each parallel part of the loading channel 133 has a lever 137A, 137B associated with its confronting cavity 135A, 135B. The left hand lever 137A is shown in its unlocked position ready to receive a cartridge 113, while the right hand lever 137B is shown in a locked position, but without a cartridge inserted.

Each cavity 135A, 135B has a protruding driving axle (or drive shaft) 139A, 139B (the driving axle 139B in FIG. 11 is hidden by lever 137B), and a female ingredient receiving connection 141A, 141B. These driving axles (or drive shafts) 139A, 139B and female ingredient receiving connections 141A, 141B are each positioned for engaging the drive port 125 and ingredient outlet port 127 of the doser 119 of the relevant cartridge 113. As described hereinbefore, in each cartridge or exchangeable supply pack 2 positioned, the corresponding driving axle 139A or 139B is received in an axle reception opening, such as element 59 described hereinbefore, and extends, within a through hole (e.g. such as element 55) of a flexible seal, towards and into a shaft opening (e.g. such as shaft opening 57 of driving gear 13) for operating a gear pump inside the doser.

It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. An exchangeable supply pack for a beverage dispensing machine, the exchangeable supply pack comprises:
    a doser including a pump assembly,
    the pump assembly comprising a pump channel between an inlet and an outlet for receiving a fluid from an ingredient container of said pack and for pumping the fluid to the outlet, the pump assembly further comprising a pump chamber and at least two mutually engaging gears forming a gear pump arranged in said pump chamber,
    wherein at least one of said gears forms a driving gear, the driving gear comprising a shaft opening for receiving a driving axle of the beverage dispensing machine for operating the gear pump,
    wherein the shaft opening coincides with an axle reception opening of a support wall of the pump chamber, and
    wherein a flexible seal is arranged at least between the driving gear and the support wall, wherein the seal comprises a through opening coinciding with the shaft opening and the axle reception opening for receiving the driving axle.

2. The exchangeable supply pack according to claim 1, wherein the driving gear comprises a circumferential rim surrounding the shaft opening.

3. The exchangeable supply pack according to claim 2, wherein the rim is arranged concentrically around the shaft opening in rotation symmetry therewith.

4. The exchangeable supply pack according to claim 2, wherein a height of the rim divided by the height of the driving gear is between 0.015 and 0.044.

5. The exchangeable supply pack according to claim 2, wherein the rim is shaped having rounded edges in cross section across a radial direction relative to the shaft opening of the driving gear.

6. The exchangeable supply pack according to claim 1, wherein the flexible seal is made of a liquid silicone rubber.

7. The exchangeable supply pack according to claim 6, wherein the liquid silicone rubber has a shore A hardness between 35 and 65.

8. The exchangeable supply pack according to claim 1, wherein the support wall comprises one or more reinforcement ribs, the reinforcement ribs comprising at least a first circumferential support rib arranged underneath the rim of the driving gear and cooperating with the rim.

9. The exchangeable supply pack according to claim 8, wherein the reinforcement ribs form a reinforcement web, the reinforcement ribs further comprising one or more or all elements of a group comprising:
    a second circumferential support rib arranged underneath a further gear of the at least two mutually engaging gears and circumferentially arranged around a notional rotation axis of the further gear; and
    an outer reinforcement rib circumferentially arranged at a periphery of the reinforcement web underneath one or more side walls of the pumping channel;
    one or more reinforcement ribs being formed and arranged such as to connect a first location, a second location and a third location with the reinforcement web, wherein the first location corresponds with an engagement location of the gears, the second location corresponds with a contact location between the driving gear and the pumping channel, and the third location corresponds with a contact location between the further gear and the pumping channel; and
    one or more auxiliary reinforcement ribs connecting the other reinforcement ribs of the reinforcement web to the outer reinforcement rib.

10. The exchangeable supply pack according to claim 1, wherein one or more pressure relief grooves are arranged near an engagement location of the at least two mutually engaging gears for releasing fluid trapped between the at least two gears in use, the pressure relief grooves being arranged in a wall of the pumping channel or in the flexible seal.

11. The exchangeable supply pack according to claim 1, wherein the pump assembly comprises a pump housing and bottom housing, wherein the pump housing and bottom housing are correspondingly shaped such as to enable engagement of the pump housing and bottom housing for forming the pump channel.

12. The exchangeable supply pack according to claim 11, wherein the flexible seal is arranged contiguous to the bottom housing and is correspondingly shaped with the pump channel such as to seal the pump channel at the connection between the bottom housing and the pump housing.

13. The exchangeable supply pack according to claim 11, wherein the pump chamber comprises side walls formed by the pump housing, the side walls forming a periphery of the pumping chamber, and wherein the flexible seal extends underneath and beyond the side walls for at least a part of the periphery of the pumping chamber such that the seal is fixed in between the pump housing and the bottom housing.

14. The exchangeable supply pack according to claim 11, wherein the support wall of the pump channel is provided by the bottom housing as an integral part thereof.

15. The exchangeable supply pack according to claim 11, wherein the support wall is formed by a separate support plate arranged contiguous to the seal.

16. A doser for use in an exchangeable supply pack for a beverage dispensing machine, the exchangeable supply pack having an ingredient container and the beverage dispensing machine having a driving axle extending therefrom, the doser comprises:
    a pump assembly, the pump assembly comprising:
    a pump channel between an inlet and an outlet for receiving a fluid from the ingredient container of said exchangeable supply pack and for pumping the fluid to the outlet,
    a pump chamber, and
    at least two mutually engaging gears forming a gear pump arranged in said pump chamber, wherein at least one of said gears forms a driving gear, the driving gear comprising a shaft opening for receiving the driving axle of the beverage dispensing machine for operating the gear pump, wherein the shaft opening coincides with an axle reception opening of a support wall of the pump chamber, and wherein a flexible seal is arranged at least between the driving gear and the support wall, wherein the seal comprises a through opening coinciding with the shaft opening and the axle reception opening for receiving the driving axle.

17. A pump assembly for use in a doser of an exchangeable supply pack for a beverage dispensing machine, the pump assembly comprising:

a pump channel between an inlet and an outlet for receiving a fluid from an ingredient container of said pack and for pumping the fluid to the outlet, a pump chamber and at least two mutually engaging gears forming a gear pump arranged in said pump chamber, wherein at least one of said gears forms a driving gear, the driving gear comprising a shaft opening for receiving a driving axle of the beverage dispensing machine for operating the gear pump, wherein the shaft opening coincides with an axle reception opening of a support wall of the pump chamber, and wherein a flexible seal is arranged at least between the driving gear and the support wall, wherein the seal comprises a through opening coinciding with the shaft opening and the axle reception opening for receiving the driving axle.

18. The pump assembly according to claim 17, wherein the driving gear comprises a circumferential rim surrounding the shaft opening for locally compressing the seal against the support wall for preventing leakage of the fluid through the through opening of the seal.

19. A system for dispensing of beverages, the system comprising:

a beverage dispensing machine comprising a loading channel, and an exchangeable supply pack, the exchangeable supply pack comprising a doser including a pump assembly comprising at least two engaging gears forming a gear pump, wherein at least one of the at least two gears forms a driving gear comprising a shaft opening, the beverage dispensing machine further comprising a driving axle, the driving axle being arranged for extending thereof into an axle reception opening of the doser and into the shaft opening for engaging with the driving gear, wherein a flexible seal is arranged at least between the driving gear and the support wall, and wherein the seal comprises a through opening coinciding with the shaft opening and the axle reception opening for receiving the driving axle.

20. The exchangeable supply pack according to claim 1, wherein the flexible seal is at least partly compressed between the driving gear and the support wall.

* * * * *